United States Patent Office 3,342,674
Patented Sept. 19, 1967

3,342,674
STERILIZING, SANITIZING, AND/OR
DISINFECTING SHAPES
Xavier Kowalski, Creve Coeur, Mo., assignor to Monsanto Company, St. Louis, Mo., a corporation of Delaware
No Drawing. Filed Mar. 3, 1965, Ser. No. 436,920
9 Claims. (Cl. 167—42)

The present invention relates to novel sterilizing, sanitizing, and/or disinfecting compositions and to processes for preparing said compositions. The present invention further relates to stable compositions, in dosage unit form, containing a chlorine liberating compound, from which active and/or available chlorine may be controllably released over prolonged periods of time. The present invention more particularly relates to stable, novel, sterilizing and/or disinfecting shapes or sticks containing an N-halogen organic heterocyclic compound or an alkaline earth metal hypochlorite compound and which are usable and efficient in maintaining a substantially constant effective level of active chlorine under use conditions, e.g. in swimming pool water and other aqueous media, for prolonged periods of time. The present invention also relates to novel processes for preparing such stable compositions in the form of various solid shapes or configurations, including sticks and the like. The expression or term "stick" or "sticks" as used herein refers to a solid cylindrical shaped or tubular article which is composed of various percentages of compounds which have been mixed together to form the novel composition of the present invention and subsequently compressed together to form such sticks. The preferred sticks of the present invention are solid cylinders similar in size to the commercially available, underarm deodorant sticks.

The term "dosage unit form" as used herein is intended to mean and to refer to solid, physically stable, compact, fabricated compositions in distinct units, which units will not instantaneously disintegrate (but rather require some period of time, for example, 5 hours to 2 days depending upon the size of the stick, to erode or dissolve) when immersed in water or other aqueous media. The term "dosage unit form," as used herein, is also intended to mean a solid, compressed composition fabricated without adhesive additives or binders and compacted or compressed under a pressure whereby the density of the "dosage unit form" comprising various ingredients therein is at least 25% more than the density of such ingredients in the uncompressed or bulk state.

The novel sterilizing and/or disinfecting compositions in unit dosage form or stick form may be used in any apparatus or device which promotes slow and uniform erosion of such form when subjected to the erosive or disintegrating action of water or other aqueous media to provide a uniform supply of active and/or available chlorine in such water or aqueous media. While the stick shape or form (as above defined) is the preferred dosage unit form of the invention compositions in other configurations or shapes may also be used in aqueous media for supplying active and/or available chlorine thereto. Other such configurations may include granules, tablets, pills, pellets, briquettes, and the like. The various aforementioned configurations, including the stick shape, may contain varying but predetermined amounts of a solid compound capable of releasing available chlorine when contacted with water such as a chlorinated triazine compound or an alkaline earth metal hypochlorite compound and mixtures thereof of the compositions hereinafter described. Such dosage unit form generally contains predetermined amounts of available chlorine, usually provided by a chlorinated cyanuric acid compound, or calcium hypochlorite, and may vary widely in size and/or configuration depending upon the use of the particular composition.

The present invention, however, is more particularly directed to sterilizing and disinfecting sticks which are particularly applicable to treating water in swimming pools and can easily be incorporated in the water circulation system thereof to erode and release active and/or available chlorine in the circulating water in uniform and readily controlled quantities. The novel compositions of this invention, in dosage unit form, are surprisingly chemically stable to loss of available chlorine for long periods of time when stored in an air atmosphere characterized by high temperatures (e.g., 90–120° F.) and high humidity (e.g., 50–95%).

Compositions of matter containing certain chlorinated cyanuric acid compounds have previously been described as bleaching, sterilizing and disinfecting agents. Such compositions contain compounds such as trichlorocyanuric acid (U.S. 3,002,931), dichlorocyanuric acid or the sodium salt of dichlorocyanuric acid (U.S. 2,913,460), or N-chlorinated hydantoins such as 1,3-dichloro-5,5-dimethylhydantoin; or chlorinated melamine. Of the abovementioned compounds, trichlorocyanuric acid and dichlorocyanuric acid, have more recently been employed commercially in bleaching, sterilizing and disinfecting compositions. These last mentioned compounds have usually been marketed as dry powders per se or have been suggested for use in substantially dry, formulated compositions in combination with other compounds such as certain anionic sulfates or sulfonates, as for example, sodium salts of long chain alkyl sulfates, sodium salts of alkyl naphthalene sulfonic acids, sodium salts of alkyl benzene sulfonic acids and the like. Compositions such as those described in the aforementioned patents preferably also contain one or more detergent builder salts including alkaline, water-soluble, alkali metal salts such as tri-alkali metal phosphates, di-alkali metal hydrogen phosphates, alkali metal pyro, ortho, and metaphosphates, and inert diluents, which may also have detergent building properties, such as for example, neutral, inert, alkali metal sulfates and chlorides. Such dry powdered compositions have certain limitations in that, in most instances, they have to be accurately measured before being added to aqueous media in bleaching, sterilizing, or disinfecting procedures such as, for example, the wash liquor in a dishwashing or laundering operation, the water in a swimming pool or in a lavatory sanitizing operation. Also, particularly in the latter two instances, an excessive amount of chlorine-containing material must be added initially in order to maintain an effective active chlorine level for even a short period of time. The reason for this is that active chlorine content of such powdered compositions is dissipated rapidly in dilute aqueous solutions and the desired bleaching, sterilizing or disinfecting activty, especially the bactericidal and/or algicidal activity required for swimming pool operations, is lost in a short period of time.

It has been proposed heretofore in Example IV of U.S. Patent No. 2,607,738 and Re. 24,412, both issued to Edgar E. Hardy, that 9.52 parts of trichlorocyanuric acid, 41.98 parts of trisodium phosphate and 2.5 parts of starch or other suitable binder may be uniformly blended together to form a dry stable mixture which can be subsequently pressed into cubes suitable for use as household bleach. Hardy further notes that certain alkaline salts are suitable for use in his compositions including alkaline salts such as sodium carbonate, borate, silicate, or phosphate. Although the cubes or tablets disclosed in these Hardy patents overcome some of the disadvantages inherent in the use of powders, such cubes or tablets contain substantial quantities of starch which after a period of time tends to react with and/or decompose trichlorocyanuric acid. Such compositions tend to lose available chlorine after they have been stored for some time, and particularly in the presence of small amounts of moisture.

Thus, it has been found that when such cubes or tablets contain even small amounts of moisture, whether by accidental contamination, or otherwise or by the addition to water, the trichlorocyanuric acid tends to decompose and the compositions tend to lose available chlorine at a relatively rapid rate. This means that the moisture contaminated cubes or tablets contain less available chlorine than would be expected on the basis of the trichlorocyanuric acid initially present therein and consequently, under such circumstances, the cubes or tablets are usually deficient in available chlorine for the general purpose for which they were initially formulated. Contamination of the cubes or tablets with moisture may also occur by mixing the ingredients in the presence of moisture without taking precaution to keep the ingredients in a dry state or by storing the cubes or tablets in open containers or in containers which are not sufficiently tight to exclude moisture.

Loss of available chlorine is also experienced when such cubes or tablets are added to water, in which they rapidly dissolve or disperse to form aqueous solutions and/or suspensions, when such aqueous solutions or suspensions are left to stand or are permitted to stand for some period of time before and during use. Thus, in an application, such as the use of such cubes or tablets in disinfecting water in swimming pools, excessive amounts of such cubes or tablets must be added to the swimming pool water if an effective level of available chlorine is to be maintained for a practical period of time. Also, as noted above, the cubes or tablets may become contaminated with moisture prior to use in various ways with the resulting loss in available chlorine. In addition to the Hardy patent reissue 24,412, another patent which may be somewhat related to the subject matter of the present application is Canadian patent 607,971.

Any particular problems associated with the utilization of compositions in dosage unit form, specifically as sticks, in swimming pool water as a disinfectant, sanitizing and/or sterilizing composition is usually associated with the effect which water will have on such dosage unit form or on the sticks per se, specifically, the sticks will tend to crack and swell easily due to the high rate of solubility of the stick in water or high erosion rate therein which will then result in an erratic chlorine supply to the swimming pool water.

In the past, disinfectant compositions (in powder, granular, tablet, pellet, etc. forms) were highly unsatisfactory in supplying available chlorine atoms to swimming pool water or other aqueous media because of the dissolution, erosion, etc. rates thereby resulting in an erratic supply of chlorine thereto. Specifically and stated in other words, if, for example, a composition in powdered, granular or tablet form was added to swimming pool water, the amount would be added all at one time and the swimming pool water would be "slugged" with a very concentrated solution of available chlorine. The present invention yields a highly satisfactory disinfectant stick which has unique solubility, dissolution and erosion rates in aqueous media whereby there is supplied to such media a constant and/or controllable amount of available chlorine at a predetermined rate, as in the water of a swimming pool.

It is thus seen from the aforementioned discussion and/or description that there is a definite need for unit dosage forms or sticks of the type described herein which do not exhibit undue loss of available chlorine during storage under normally prevailing conditions and which, when placed in a suitable apparatus or device in which such forms or sticks can be eroded by the action of water, will controllably release available chlorine and will maintain a substantially constant level of available chlorine in such water or other aqueous media (as in a swimming pool) for prolonged periods of time.

While it is known in the art that trichloroisocyanuric acid per se and an alkali or alkaline earth metal hydrochlorite per se (particularly calcium hypochlorite) are chemical compounds which may be used to supply available chlorine to an aqueous media such as swimming pool water, calcium hypochlorite per se forms a very poor unit dosage form or stick in that both its manufacturing characteristics, i.e., ability to form and hold a stick shape, are poor and its erosion rates are too high for practical commercial purposes. Furthermore, swelling and crumbling of said hypochlorite stick in contact with water occurs readily. On the other hand, trichloroisocyanuric acid per se may be formed into a stick, but the properties or characteristics of such a stick, i.e., its ability to form and hold a stick shape, are poor and, therefore, such stick is not satisfactory for practical commercial purposes, specifically where a constant and controllable rate of available chlorine is required to be fed to an aqueous media. From the following description and Tables I and II herein, it will be seen that the novel and unobvious contribution to the art entails the incorporation of a solid N-chlorinateable compound such as cyanuric acid and a metal salt of an aliphatic carboxylic acid having at least 10 carbon atoms in the aliphatic group, with a non-deliquescent, solid, available chlorine-containing compound such as trichloroisocyanuric acid or calcium hypochlorite, to provide a dosage unit form which will have desirable erosion, dissolution, and/or solubility rates suitable for supplying available chlorine to swimming pool water in proportions which are well within the standards recommended by various state and Federal public health departments.

Thus, it will be shown from the description and data hereinafter set forth that the incorporation of a solid N-chlorinateable compound such as cyanuric acid with a solid compound which supplies available chlorine such as trichloroisocyanuric acid or calcium hypochlorite, in addition to a metal salt of an aliphatic carboxylic acid having at least 10 carbon atoms in the aliphatic group, will yield a stick configuration and composition which is highly satisfactory for the particular end use of supplying available chlorine, at a continuous and controllable rate, to a large body of water such as that in a swimming pool or commercial cooling towers. The novelty, unobviousness and uniqueness of the present invention are readily seen from the data and discussion hereinafter set forth.

It is accordingly one object of the present invention to provide sterilizing, sanitizing, and/or disinfecting compositions, in dosage unit form, comprising chlorine containing compounds from which available chlorine can be released in aqueous media over a predetermined period of time or over prolonged periods of time, if desired, and which exhibit improved stability toward loss of available chlorine during storage in the presence of moisture.

It is a further object of this invention to provid novel, stable compositions, in dosage unit form, containing chlorinated cyanuric acid compounds and which are efficient in maintaining, in aqueous media such as swimming pool water, constant and controlled levels of active chlorine for sterilizing and/or disinfecting operations over predetermined periods of time or over prolonged periods of time if desired.

It is a further object of this invention to provide novel, stable compositions, in dosage unit form, containing alkaline earth metal hypochlorite compounds which are efficient in maintaining, in aqueous media such as swimming pool water, constant and controlled level of active chlorine for sterilizing and/or disinfecting operations over a predetermined period of time and over prolonged periods of time, if desired.

It is still another object of the present invention to provide novel processes for preparing the composition referred to in the preceding objects.

Still further objects and advantages of the present invention will be apparent from the following description and the appended claims.

The present invention, in general, provides composition, in dosage unit form, comprising mixtures of (a) a non-deliquescent, solid, chlorine-containing compound having low solubility characteristics and which upon contact with water will release available chlorine into said water; (b) a metal salt of an aliphatic carboxylic acid and (c) a solid N-chlorinateable compound, preferably a heterocyclic organic compound having in one tautomeric form the following structural formula:

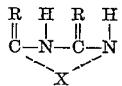

where X is selected from the group consisting of

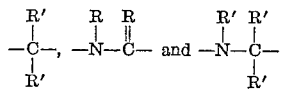

where R is selected from oxygen and NH and R' is selected from hydrogen and alkyl radicals, preferably alkyl radicals containing from 1 to 10 carbon atoms, more particularly methyl groups.

More specifically, in a preferred embodiment the present invention provides compositions, in dosage unit form, comprising (a) mixtures of trichloroisocyanuric acid, cyanuric acid, and from about 0.5% to about 2.0% by weight based on the weight of the composition of a metal salt of an aliphatic carboxylic acid, preferably an alkyl carboxylic acid or fatty acid having at least 10 carbon atoms in the aliphatic or alkyl groups; or (b) mixtures of calcium hypochlorite, cyanuric acid, and a metal salt of an aliphatic carboxylic acid such as described above.

The compositions of this invention are otherwise substantially free from other organic materials and have excellent storage stability in the presence of air and will controllably release available chlorine, in aqueous media such as cooling tower water and swimming pool water, in sterilizing, sanitizing and/or disinfecting operations over a predetermined period of time or over prolonged periods of time if desired.

The trichlorocyanuric acid employed in the compositions of this invention has been described in the literature and has been referred to as possibly existing in the keto- and enol forms. In any event, the compound has a theoretical available chlorine content of 91.5%. The commercially available product containing between about 84 and 91.5% available chlorine can also be used. The term "available chlorine" as employed herein is used in its usual technical meaning as employed in the sodium hypochlorite art. The "available chlorine" in a given compound is determined by analyzing from the amount of chlorine that can be liberated from the compound by treatment with an aqueous acid solution. "Trichloroisocyanuric" acid and "trichlorocyanuric" acid are used interchangeably throughout the present application and are deemed equivalent for the purposes of this invention.

Metal salts of aliphatic carboxylic acids which have at least 10 carbon atoms, preferably between 10 and 30 carbon atoms, in the aliphatic or alkyl group which are suitable for inclusion in the compositions of this invention include fatty acids such as unsaturated mono- and dicarboxylic acids, and hydroxy carboxylic acids which are saturated and unsaturated and have at least 10 carbon atoms in the aliphatic or alkyl group. Examples of metal salts of unsaturated mono-carboxylic acids which may be employed include, for example, salts of hypogeic, oleic, elaidic, erucic, behenic, linoleic and linolenic, brassidic acids and unsaturated hydroxy carboxylic acids such as ricinoleic acid; examples of metal salts of unsaturated dicarboxylic acids include metal salts of 2-dodecenedioic acid, tridecenedioic acid and the like; examples of salts of alkyl (saturated) monocarboxylic acids include salts of undecylic, lauric, myristic, palmitic, margaric, stearic acids; examples of salts of alkyl dicarboxylic acids include salts of decanedioic, undecanedioic, tridecanedioic, pentadecanedioic acids. Metal salts of saturated monocarboxylic acids having from 10 to 18 carbon atoms are particularly preferred.

Suitable metal salts of the above-described carboxylic acids include alkali metal salts such as sodium potassium and lithium salts; alkaline earth metal salts such as calcium and barium salts; and zinc and magnesium salts. For example, alkali metal oleates, palmitates, stearates and the like as well as the corresponding alkaline earth salts and the zinc and magnesium salts are particularly suitable; alkaline alkali (calcium and sodium) stearates being the most preferred. Actually for swimming pool use, sodium stearate is preferred over the calcium salt since it is more soluble in water in the low concentrations in which it is used in the compositions of this invention.

It has presently been found that cyanuric acid is more desirable for most purposes than the other solid N-chlorinateable compounds or organic compounds which fall in the scope of the above formula, but it is to be understood that organic compounds having in one tautomeric form the structural formula given above fall within the scope of the present invention. As examples of organic compounds which fall within the scope of the above structural formula and which can be used in the compositions of this invention, there may be mentioned cyanuric acid, ammeline, ammelide, melamine, alkyl guanamines, preferably those having from 1 to 10 carbon atoms as, for example, ethyl and butyl guanamine, α-dimethyl hydantoin, hydantoin, α-methyl hydantoin, substituted glycolurils, substituted benzoylene ureas, and the like.

As immediately set forth in the above paragraph, cyanuric acid is a more desirable organic compound which falls within the scope of the aforementioned formula. Utilization of cyanuric acid in the compositions of the present invention yields a stick formulation which is highly satisfactory for the particular end use and is particularly suitable for use in such formulations. Specifically, it is believed that the cyanuric acid when used in conjunction with trichlorocyanuric acid or calcium hypochloride produces a composition which has the desirable characteristics, i.e. solubility rate, of dichloroisocyanuric acid. A dichloroisocyanuric acid stick per se when contacted with water results in excessive swelling which is a highly undesirable characteristic because swelling causes relatively rapid disintegration of the stick, also, such stick is deliquescent and has a high solubility rate. A trichloroisocyanuric acid stick per se when contacted with water produces an offensive odor, and the solubility rate of this stick is very low. It was unexpectedly discovered in the present invention that the use of cyanuric acid with trichloroisocyanuric acid produced a high quality stick which could be effectively eroded by impinging jets of water on one end thereof while said stick was in a vertical position to yield a continuous and controllable rate of available chlorine and subsequently supplying said chlorine to an aqueous media. It is also believed that cyanuric acid stabilizes the chlorine in the aqueous media or water and prevents the ultra-violet rays of the sun from converting the available chlorine ultimately into chloride ions which render the chlorine useless for its intended use.

In a preferred embodiment of the invention, the compositions, in dosage unit form, comprise, on a solid basis,
(a) from about 50% to about 90%, preferably from about 75% to 80% by weight of trichlorocyanuric acid,
(b) from about 50% to about 10%, preferably from about 24% to about 19% by weight of cyanuric acid,
and (c) from about .25 to about 2.0% preferably from about .5 to about 1.5% by weight of sodium or calcium stearate.

In another preferred embodiment of the invention, the compositions in dosage unit form, comprise, on a solid basis, (a) from about 40 to 60%, preferably from about 50 to 55% by weight of calcium hypochlorite, (b) from about 60 to 40%, preferably from about 49 to 45% by weight of cyanuric acid, and from 0.25 to about 2.0%, preferably from about .5 to about 1.5% by weight of calcium or sodium stearate. As previously set forth in the objects of this invention, such novel compositions are useful in swimming pool water, as disinfection and sanitation agents.

The size of the particles of the various ingredients used to make or prepare the novel compositions of the present invention are deemed critical and have a significant effect on the dosage unit form or stick per se, specifically the erosion and/or dissolution rate. The chlorine-containing compounds such as trichloroisocyanuric acid and calcium hypochlorite and a solid N-chlorinateable compound such as cyanuric acid used should be the granular form, that is, they will pass through a No. 10 mesh U.S. standard screen and all or substantially all of the particles should be retained on a No. 80 mesh U.S. standard screen.[1] Stated differently, the size of the particles are such to be in the range that more than 90% of the particles or crystals will pass through a sieve or screen opening having an area of 2.0 square millimeters and will not pass through or be retained on a sieve or screen having 0.18 square millimeter opening. The before-mentioned particle sizes usually connotate a granular material and is the preferred embodiment of the present invention, however, extra granular or larger particles of material may be acceptable and can be used and is within the scope of the present invention.

As stated above, the main ingredients in the stick formulations or compositions are granular, whereas the particle size of the particles of the metal salt of the aliphatic carboxylic acid, e.g. sodium or calcium stearate, is usually in the range of between 1 to 100 microns and preferably between 1 and 50 microns, i.e. powdered material, and usually adheres to and coats the larger particles of the main ingredients when mixed therewith. These powdered metal salts not only act as a lubricant for the stick while it is being compressed but such salts also have a very critical effect on the erosion and/or dissolution rates of the stick when such sticks are contacted with an aqueous media such as water.

It is not readily understood by what mechanical or chemical means the metal salts contribute to the good stick formulation and desirable characteristics thereof. One theory, in conjunction with the erosion data obtained when using such metal salt, is that there may be an interaction between the main ingredients and the metal salts to yield the favorable end results. The aforementioned theories are merely ideas as to what may happen and the exact chemistry is not known and the applicant does not wish to be limited to any theory or ideas presented herein in conjunction with his novel stick composition.

The stick or dosage unit form of the present invention may weigh from 50 to 1,000 grams or more and preferably from 100 to 500 grams depending upon its size and intended use, and may contain from 30% to as much as 80% available chlorine depending upon the particular non-deliquescent, solid, chlorine-containing compound used. The preferable size of the sticks to be used to supply chlorine ranges from about ¾ inch to approximately 1½ inches in diameter and from about 4 inches to about 6 inches in height or length and weigh from about 200 to about 250 grams. The stick density ranges from approximately 90 to about 110 pounds per cubic foot; the average density of the sticks is about 100 pounds per cubic foot. The stick can be formulated so as to erode, dissolve, or disperse in an aqueous media such as swimming pool water over a period of from approximately 1 hour up to about 64 hours or longer depending upon factors such as (1) the size of the sticks, (2) the volume of the water being treated, and (3) the rate at which such media is permitted to erode or dissolve the unit dosage form.

The general process for preparing the dosage unit form or sticks usually entails the steps of mixing the ingredients together to form a uniform mixture and compressing the mixture under pressure to form a dosage unit form or solid stick, preferably the compressing step is carried out until the dosage unit form or stick has the dimensions and densities hereinbefore described.

The mixing (preferably by mechanical means) of the various ingredients, prior to compression into dosage unit form, may be accomplished in a number of ways commonly employed in mixing dry or substantially dry materials such as for example, by stirring, tumbling, and the like. It is important, however, that the mixing be carried out in such a manner that the particle size of the particles of the various ingredients is not appreciably altered in mixing the dry materials; tumbling is particularly preferred. By this aforementioned intimately mixing step, a dry, flowable, and uniform mixture or composition is formed which after being compressed into a dosage unit form such as a stick will not exhibit in said stick any separate layers or strata of individual ingredients. The mixtures or compositions, prepared as described above, may be then converted or compressed into a variety of configurations to provide the dosage unit form of the present invention. The configuration which is preferable is a stick such as a right cylinder which will in most instances provide a dosage unit form of sufficient mechanical strength to substantially minimize or prevent fracture under shipping, handling, and storage conditions. In addition, such sticks, when contacted with water under conditions conducive to erosion, will usually erode uniformly and supply a continuous and constant rate of available chlorine to swimming pool water. The preferred dosage unit form or stick in the configuration of a right cylinder may have any diameter and/or length desired, but preferably as hereinbefore described, and such forms or sticks may be obtained or shaped by employing a variety of apparatuses or presses such as, for example, a Colton Press or a Carver Press.

A wide range of pressures may be used to form the sticks of this invention and the dispersion time of the finished product is only partially effected by the compression pressure and compression time employed. Thus, for example, a predetermined amount of the uniform mixture of ingredients is injected into the die of the press, compressed at a pressure of from 11,000 to about 12,000 p.s.i. for a period ranging from 1 second up to 30 minutes and even greater and removed from said die. It has been ascertained that with a pressure of about 3,000 to 18,000 p.s.i. satisfactory forms or sticks can be obtained. On the other hand, at pressures of approximately 2,000 p.s.i., the sticks usually will fall apart and at a pressure of as high as 20,000 p.s.i., the sticks will exhibit a very low solubility and/or erosion rate when subjected to contact with an aqueous media.

In conjunction with the over-all process for manufacturing the sticks of the present invention and, more specifically, the items set forth under the heading "Stick Manufacture" which are found in the subsequent tables, the formation of the stick and its compacting aspects refer mainly to the physical characteristics and appearance and these to some extent are dependent on the amount of salt of carboxylic acid (e.g. stearate) used which is believed to act as a lubricant. The mold release data referred to in the tables indicate generally the ease with which the stick could be pushed out from the die which in turn is dependent upon the amount of the lubricant used. The item designated "capping" in the tables generally refers to the small lumps, if any, of material sticking to the die surface. Rusting of the dies was not experienced in the production of the sticks due to the fact that water was

---

[1] For example, as much as 20% of the material could be retained on a No. 20 mesh screen.

not used in the compositions or formulations. It was also ascertained during the stick manufacturing that it was important to have a uniform distribution of the salt of the carboxylic acid, such as stearate, throughout the mixture or composition because it is believed to effect the ease of compacting. The lack of uniformity in particle size distribution of the ingredients in the mixtures is apt to cause variation in stick length, stick strength, and corrosion rates. The term "stick strength" generally refers to the length of stick which can be handled without severe breaking problems.

In accordance with the processes of the present invention, it has been found possible to compress the hereinbefore described mixtures employed in this invention into dosage unit forms, preferably sticks, by processes which eliminate the use of organic adhesives or binders of the prior art and which also eliminate or substantially eliminate the necessity of agglomerate formation required by the prior art processes.

A further understanding of this invention will be obtained from the following specific examples which are intended to illustrate the invention but not to limit the scope therof, parts and percentages being by weight unless otherwise indicated.

EXAMPLE I

Dry, mixed compositions, containing the ingredients set forth in Table I, were prepared by mixing said ingredients in a one-half gallon jar and rotating or agitating said jar for approximately 1 to 4 minutes in order to insure thorough mixing and to prevent any segregation of the individual ingredients. The various ingredients and their specifications are set forth immediately below and were typical of the materials used in preparing the novel compositions.

*Trichlorocyanuric acid*

| Characteristics: | | Limits, percent |
|---|---|---|
| Available chlorine | min | 88 |
| Moisture | max | 0.2 |
| Screen analysis (cumulative values): | | |
| On 30 mesh | max | 2.0 |
| On 60 mesh | min | 85 |
| On 100 mesh | min | 90 |
| —100 mesh | max | 10 |

*Cyanuric acid*

| | | |
|---|---|---|
| Moisture | max | 0.5 |
| Screen analysis (cumulative values): | | |
| On 20 mesh | max | 1 |
| On 30 mesh | max | 20 |
| On 100 mesh | min | 90 |
| —100 | max | 10 |

*Sodium stearate*

| Screen analysis: | |
|---|---|
| On 140 mesh | 1.2 |
| On 170 mesh | 2.6 |
| On 230 mesh | 6.0 |
| On 270 mesh | 44.0 |
| —270 mesh | 47.0 |

NOTE.—The above screen sizes refer to U.S. standard mesh screens.

The dried and mixed ingredients in the form of a uniform mixture were then compressed by a Carver Press for approximately 25 minutes or until the maximum pressure of approximately 12,000 p.s.i. was reached. A predetermined amount of the composition was used in order to yield a stick which was approximately 1 to 1½″ in diameter and approximately 5″ in length and also weighed approximately 225 to 230 grams.

In order to ascertain the erosion rate which would then be directly proportional to the amount of available chlorine being generated and in commercial application would be directly proportional to the amount and/or frequency of the available chlorine being injected into a large aqueous body such as water in a swimming pool, the sticks were tested in an apparatus in which the sticks were mounted vertically with the upper portion of the sticks being held in place and a jet of water was impinged on the lower end of the stick.

The data obtained by such erosion of the stick is set forth in Table I, in addition to the data concerning the manufacturing or production of the stick per se.

In order to measure the swelling characteristics of the stick, the sticks positioned in a vertical manner were immersed in a body of water one inch deep and at a temperature of 80° F. and allowed to stand for approximately one hour. The extent of swelling and cracking was then determined by visual observation. The results of this test for determining the tendency of the stick to swell are also set forth in Table I at the bottom thereof.

The important factors or conditions for testing a particular stick in conjunction with the erosion rates were (1) water temperature, (2) the force and volume of water stream impinged on the stick per unit of time, (3) the stick swelling characteristics and (4) the length of stick eroded. It was ascertained during the test that the stick should be eroded for at least 24 hours or longer to obtain reliable erosion rates because shorter periods are apt to produce misleading results.

The quantitative test for ascertaining the stick erosion is set forth as follows:

The total weight of the stick was determined prior to inserting it into the erosion apparatus. The stick was positioned in said apparatus in a vertical manner whereby jets of water could be directed in a downwardly manner at the lower end of the vertical stick. The jets of water were approximately 1/32 of an inch in diameter and positioned around the circumference of the stick. The water was maintained at a temperature of approximately 80° F., plus or minus 1°, during the erosion period. The total water rate was approximately ½ gallon per minute. After a minimum of 24 hours the water supply was turned off and the sticks were removed from the erosion apparatus and re-weighed. The erosion rate and the amount of available chlorine supplied to the erosion media were determined by the following formula:

(A) Weight of stick (ounces)/24 hours=

$$\frac{(A-B)\times 24}{C}$$

(B) Weight of available chlorine (ounces)/24 hours=

$$\frac{(A-B)\times 24\times D}{C\times 100}$$

where $A$=Initial weight of the stick in ounces
$B$=Remaining weight of the stick in ounces
$C$=Erosion time in hours
$D$=Percent available chlorine in the stick The above formulas are generally self-explanatory. The first formula, A, gives the weight of stick in ounces which was eroded during a 24-hour period. The second formula, B, sets forth the weight in ounces of available chlorine which would be provided from the erosion of the stick per 24 hours. The above data is set forth in Table I under the subtitle "Stick Erosion." Visual observations were also made of the swelling, crumbling and type of erosion characteristics of the stick, and these observations were also noted. The physical appearance of the effluent, that is, water containing the particles of the dissolved stick, was also noted in order to ascertain if there was any scum present on the surface thereof. This latter data is also listed in Table I under the subtitle "Stick Erosion."

TABLE I.—TRICHLOROISOCYANURIC ACID-CYANURIC ACID-STEARATE STICK PROPERTIES

| Stick Number | 1 | 2 |
|---|---|---|
| Ingredients, percent: | | |
| Trichloroisocyanuric, acid gran | 77.5 | 78.0. |
| Cyanuric acid gran | 21.5 | |
| Cyanuric acid gran. (less +30 fraction) [1] | | 21.5. |
| Calcium stearate | | 0.5. |
| Sodium stearate | 1.0 | |
| Available chlorine in the stick | 69.7 | 70.2. |
| Stick Manufacture: | | |
| Pressure used, p.s.i | 12,000 | 12,000. |
| Stick formation | Good | Good. |
| Mold release | ----do---- | Do. |
| Compacting | ----do---- | Do. |
| Rusting of dies | None | None. |
| Capping (material sticking to die) | Some | Trace. |
| Stick length | 4.75 | 4.75. |
| Stick strength | Good | Good. |
| Stick Erosion: | | |
| Ounces of stick eroded/day | 3.33 | 3.3. |
| Ounces of available chlorine supplied/day | 2.30 | 2.32. |
| Swelling | None | None. |
| Crumbling | ----do---- | Do. |
| Erosion type | Irregular | Irregular. |
| Scum in effluent | None | Trace. |
| Accelerated Swelling Test: | | |
| Stick swelling | ----do---- | None. |
| Stick cracking | ----do---- | Do. |

[1] Particles retained on a 30 mesh screen were not used. Only those which had passed through the 30 mesh and were retained on an 80 mesh screen were used.

EXAMPLE II

Dry mixed compositions containing the ingredients set forth in Table II, i.e. calcium hypochlorite, cyanuric acid, and calcium stearate, were prepared in a similar manner as set forth in Example I. After the compositions were prepared by mixing the various ingredients together, said compositions were compressed by a Carver Press in a similar manner and under the same conditions as set forth in Example I. The sticks produced by the compression of a predetermined amount of said composition were then tested as described in Example I in order to ascertain the data concerning the erosion of such sticks.

The particle sizes of calcium hypochlorite and cyanuric acid were similar, i.e. granular, to the typical particle sizes of the trichlorocyanuric acid and cyanuric acid utilized in preparing the compositions set forth in Example I. The particle sizes of calcium stearate were also similar to the particle size of the sodium stearate utilized in Example I, i.e. powdered material.

TABLE II.—CALCIUM HYPOCHLORITE-CYANURIC ACID-CALCIUM STEARATE STICK PROPERTIES

| Stick Number | 1 |
|---|---|
| Ingredients, percent: | |
| Calcium hypochlorite, gran. | 52.0 |
| Cyanuric acid, gran. | 47.0 |
| Calcium stearate, powder | 1.0 |
| Available chlorine in the stick | 37.2 |
| Stick manufacture (2): | |
| Pressure used, p.s.i. | 12,000 |
| Stick formation | Good |
| Mold release | Good |
| Compacting | Good |
| Capping | None |
| Stick Length, inches | 4.687 |
| Stick strength | Good |
| Stick erosion (2): | |
| Stick eroded/day ounces | 3.44 |
| Available chlorine supplied/day do | 1.28 |
| Swelling | None |
| Crumbling | None |
| Erosion type | Clean |
| Scum in effluent | Some |
| Accelerated swelling test: | |
| Stick swelling | None |
| Stick cracking | None |

EXAMPLE III

Dry mixed compositions containing the ingredients set forth in Table III, i.e. trichloroisocyanuric acid, melamine or dimethyl hydantoin, and sodium stearate were prepared in a similar manner as set forth in Example I. After the compositions were prepared by mixing the various ingredients together, they were compressed by a Carver Press in a similar manner and under the same conditions as set forth in Example I. The sticks produced by the compression of a predetermined amount of said composition were then tested as described in Example I in order to ascertain data concerning the erosion of such sticks.

Stick No. 1 contained trichloroisocyanuric acid, melamine, and sodium stearate and stick No. 2 contained trichloroisocyanuric acid, dimethyl hydantoin, and sodium stearate. The particle sizes of the trichloroisocyanuric acid, melamine and dimethyl hydantoin were similar, i.e. granular, to the typical particle size of the trichloroisocyanuric acid and cyanuric acid utilized in preparing the compositions set forth in Example I. The particle sizes of the sodium stearate were also similar to the particle size of the sodium stearate utilized in Example I, i.e. powdered material.

TABLE III.—TRICHLOROISOCYANURIC ACID-MELAMINE OR DIMETHYL HYDANTOIN-SODIUM STEARATE STICK PROPERTIES

| | Stick 1 | Stick 2 |
|---|---|---|
| Ingredients, percent: | | |
| Trichloroisocyanuric acid, granular | 77.5 | 77.5. |
| Melamine, granular [1] | 21.5 | |
| Dimethyl hydantoin, granular [2] | | 21.5. |
| Sodium stearate, powdered | 1.0 | 1.0. |
| Available chlorine in the stick | 69.7 | 69.7. |
| Stick manufacture: | | |
| Pressure used, p.s.i. | 11,750 | 11,750. |
| Stick formation (compacting) | Good | Good. |
| Mold release | ----do---- | Do. |
| Rusting of dies | None | None. |
| Capping | Some | Some. |
| Stick length, inches | 4.75 | 5. |
| Stick strength | Fair | Fair. |
| Stick erosion: | | |
| Ounces of stick eroded/day | 0.35 | 4.24. |
| Ounces of available chlorine supplied/day | 0.24 | 2.95. |
| Swelling | None | None. |
| Crumbling | ----do---- | Do. |
| Erosion type | Slightly irregular | Slightly irregular. |
| Scum in effluent | None | None. |
| Accelerated swelling test: | | |
| Stick swelling | ----do---- | Do. |
| Stick cracking | ----do---- | Do. |

[1] Particle size analysis (Cumulative values): On 30 mesh 0%; on 80 mesh 90%.
[2] Particle size analysis (Cumulative values): On 30 mesh 2%; on 80 mesh 97%.

Tables, I, II and III hereinbefore set forth disclose the data of sticks utilizing various non-deliquescent, solid, chlorine-containing compounds. Several additional sticks were prepared using dichloroisocyanuric acid as the chlorine containing compound and without cyanuric acid combined therewith. These latter sticks were unsatisfactory in that the stick erosion rate was above 5 ounces of stick per 24-hour period. Furthermore, the dichloroisocyanuric acid sticks when subjected to the "accelerated swelling test" exhibited severe swelling and cracking tendencies.

It will be noted in the aforementioned tables that the stick erosion rate of all the sticks was below 4.3 ounces of stick eroded per 24-hour period. It is felt that a stick having an erosion rate below 5 would be most desirable since the end result is to supply available chlorine to an aqueous media at a continuous and controllable rate. An erosion rate above 5 ounces per 24-hour period does not permit proper erosion control in order to obtain the desired end result.

In the utilization of calcium or sodium stearate in the formulations of the present invention, it was discovered that the use of calcium stearate produced scum in the effluent; this may possibly result in water transfer line plugging when used on a commercial basis. The use of sodium stearate did not produce the aforementioned scum.

In conjunction with the aforementioned Table III, it will be noted that the stick erosion rate for "Stick 1" which comprises trichloroisocyanuric acid, melamine, and sodium stearate was 0.35 ounce of stick eroded per 24-hour period. While this is somewhat lower than the other sticks tested as shown by the data set forth in Tables I, II and III, this stick could be used to supply available chlorine to an aqueous media requiring low concentrations of chlorine.

What is claimed is:

1. A sterilizing, sanitizing, and disinfecting composition, in compressed solid dosage unit form, consisting essentially of a mixture of (1) a non-deliquescent, solid, chlorine containing compound which will release available chlorine upon contact with water selected from the group consisting of trichloroisocyanuric acid and calcium hypochlorite, (2) from about .25% to 2.0% by weight, based on the weight of the composition, of a metal salt of an aliphatic carboxylic acid having at least 10 carbon atoms in the aliphatic group, and (3) an organic compound having in one tautomeric form the structural formula:

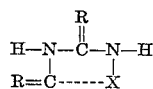

where X is selected from the group consisting of

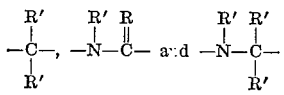

where R is selected from the group consisting of oxygen and NH and R' is selected from the group consisting of hydrogen and alkyl radicals having from 1 to 10 carbon atoms.

2. A sterilizing, sanitizing, and disinfecting composition, in compressed solid dosage unit form, consisting essentially of a mixture of granular trichloroisocyanuric acid, granular cyanuric acid, and from about 0.5% to 1.5% by weight, based on the weight of the composition, of an alkali metal stearate.

3. A sterilizing, sanitizing and disinfecting composition, in the form of a stick, consisting essentially of a uniform mixture of (1) from about 50 to about 90% by weight trichloroisocyanuric acid, (2) from about 10 to about 50% by weight cyanuric acid and (3) from about 0.5% to about 1.5% by weight, based on the weight of the composition of sodium stearate, said stick having a diameter of about ¾ to 1½ inches, a length of about 4 to 6 inches, a weight of about 200 to 250 grams and a density of about 90 to 110 pounds per cubic foot.

4. A sterilizing, sanitizing and disinfecting composition, in compressed solid dosage unit form, consisting essentially of a uniform mixture of (1) calcium hypochlorite; (2) from about .25% to about 2.0% by weight, based on the weight of the composition, of a metal salt of an aliphatic carboxylic acid having at least 10 carbon atoms in the aliphatic group; and (3) an organic compound having in one tautomeric form the structural formula:

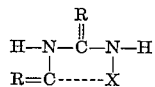

where X is selected from the group consisting of

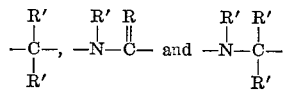

where R is selected from the group consisting of oxygen and NH and R' is selected from the group consisting of hydrogen and alkyl radicals having from 1 to 10 carbon atoms.

5. A sterilizing, sanitizing, and disinfecting composition, in compressed solid dosage unit form, consisting essentially of a uniform mixture of granular calcium hypochlorite, granular cyanuric acid, and from about 0.5% to about 1.5% by weight, based on the weight of the composition of a powdered alkaline earth metal stearate.

6. A sterilizing, sanitizing, and disinfecting composition in the form of a stick, consisting of a uniform mixture of (1) from about 40 to about 60% by weight calcium hypochlorite; (2) from about 40 to about 60% by weight cyanuric acid and (3) from about 0.5% to about 1.5% by weight, based on the weight of the composition of calcium stearate, said stick having a diameter of about ¾ to 1½ inches, a length of about 4 to 6 inches, a weight of about 200 to 250 grams and a density of about 90 to 110 pounds per cubic foot.

7. A process for preparing a composition for controllably releasing available chlorine which comprises intimately mixing (1) particles of a non-deliquescent, solid, chlorine containing compound, which will release available chlorine upon contact with water, selected from the group consisting of trichloroisocyanuric acid and calcium hypochlorite, and having a particle size in which substantially all of the particles pass through a No. 10 mesh U.S. standard screen and substantially all of said particles are retained on a No. 80 mesh U.S. standard screen with (2) from about .25% to about 2.0% by weight, based on the weight of the composition, of a metal salt of an aliphatic carboxylic acid having at least 10 carbon atoms in the aliphatic group, and (3) an organic compound having in one tautomeric form the structural formula:

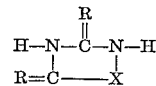

where X is selected from the group consisting of

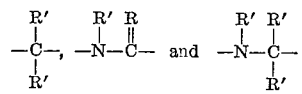

where R is selected from the group consisting of oxygen and NH and R' is selected from the group consisting of hydrogen and alkyl radicals having from 1 to 10 carbon atoms, wherein the particle size of said organic compound is substantially the same as the compound under (1), and thereafter converting the resulting mixture into compressed solid dosage unit form.

8. A process for preparing a composition for controllably releasing available chlorine into an aqueous media which comprises intimately mixing (1) from about 50 to about 90% by weight trichloroisocyanuric acid with (2) from about 10 to about 50% by weight cyanuric acid, having substantially the same particle size as the particles of said trichloroisocyanuric acid, and (3) from about 0.5% to about 1.5% by weight, based on the weight of the composition of sodium stearate, said stearate having a particle size of from about 1 to about 100 microns, and thereafter compressing said mixture at a pressure of between about 3,000 and 18,000 pounds per square inch to form a stick configuration.

9. A process for preparing a composition for controllably releasing available chlorine into swimming pool water which comprises intimately mixing (1) from about 40% to about 60% by weight granular calcium hypochlorite with (2) from about 40% to about 60% by weight granular cyanuric acid and (3) from about 0.5% to about 1.5% by weight, based on the weight of the composition, of a powdered alkaline earth metal stearate, said stearate having a particle size of from about 1 to about 100 microns, and thereafter compressing the resulting mixture under a pressure of from about 3,000 to about 18,000 pounds per square inch, into a stick configuration.

References Cited

UNITED STATES PATENTS

| | | | |
|---|---|---|---|
| 1,950,956 | 3/1934 | Wilhelm | 23—243 |
| 1,950,957 | 3/1934 | Wilhelm | 167—84 |
| 2,465,470 | 3/1949 | Omohundro et al. | 167—42 |
| 2,557,973 | 6/1951 | Kamm | 167—63 |
| 2,630,399 | 3/1953 | Sulzberger et al. | 167—63 |
| 2,638,434 | 5/1953 | Adkins | 167—63 |
| 2,819,995 | 1/1958 | Wassell | 167—42 |
| 2,914,441 | 11/1959 | Zakheim | 167—42 |

OTHER REFERENCES

Noyes, W. A.: "Science in World War II—Chemistry," pp. 176–181, 184–187, 209–213, published 1948 by Little, Brown and Co., Boston, Mass.

LEWIS GOTTS, *Primary Examiner.*

S. K. ROSE, *Assistant Examiner.*